United States Patent [19]
Goldsmith et al.

[11] Patent Number: 5,551,068
[45] Date of Patent: Aug. 27, 1996

[54] METHOD AND APPARATUS FOR COMMUNICATION VARIABLE LENGTH MESSAGES BETWEEN REGISTER MODELED RADIO DEVICES

[75] Inventors: Eric S. Goldsmith, Davie; Jeffrey W. Klingberg, Fort Worth; Ronald L. Bane; Charles M. Ehmann, both of Plantation, all of Fla.

[73] Assignee: Motorola, Inc., Schaumburg, Ill.

[21] Appl. No.: 241,951

[22] Filed: May 12, 1994

Related U.S. Application Data

[63] Continuation of Ser. No. 889,348, May 28, 1992, abandoned.

[51] Int. Cl.$^6$ .................... H04B 1/38; H04J 3/16
[52] U.S. Cl. .................. 455/89; 370/85.1; 370/95.1
[58] Field of Search .................. 455/89; 370/85.1, 370/85.3, 94.1, 95.1, 95.3; 375/222, 223, 377; 364/900

[56] References Cited

U.S. PATENT DOCUMENTS

| | | |
|---|---|---|
| 4,136,400 | 1/1979 | Caswell et al. .................. 364/900 |
| 4,637,022 | 1/1987 | Burke et al. . |
| 4,684,941 | 8/1987 | Smith et al. . |
| 5,181,201 | 1/1993 | Schauss et al. .................. 370/85.1 |

*Primary Examiner*—Reinhard J. Eisenzopf
*Assistant Examiner*—Thanh Le
*Attorney, Agent, or Firm*—M. Mansour Ghomeshi

[57] ABSTRACT

A radio system (100) includes a plurality of addressable processors (150, 180, and 200). A communication link (230) interconnects the addressable processors (150, 180, and 200). The communication between the addressable processors is conducted via a first and a second communication protocols. The first communication protocol includes a plurality of fixed length information packets for passing parametric data to or from the addressable processors at a fixed baud rate including a packet for changing the communication protocol. The second communication protocol includes a plurality of variable length information packets for passing parametric data to or from the addressable processors at selectable speeds. Whereby the operating state of the addressable processors may be determined or altered by, respectively, communicating parametric data from or to the addressable processor at variable baud rates.

22 Claims, 11 Drawing Sheets

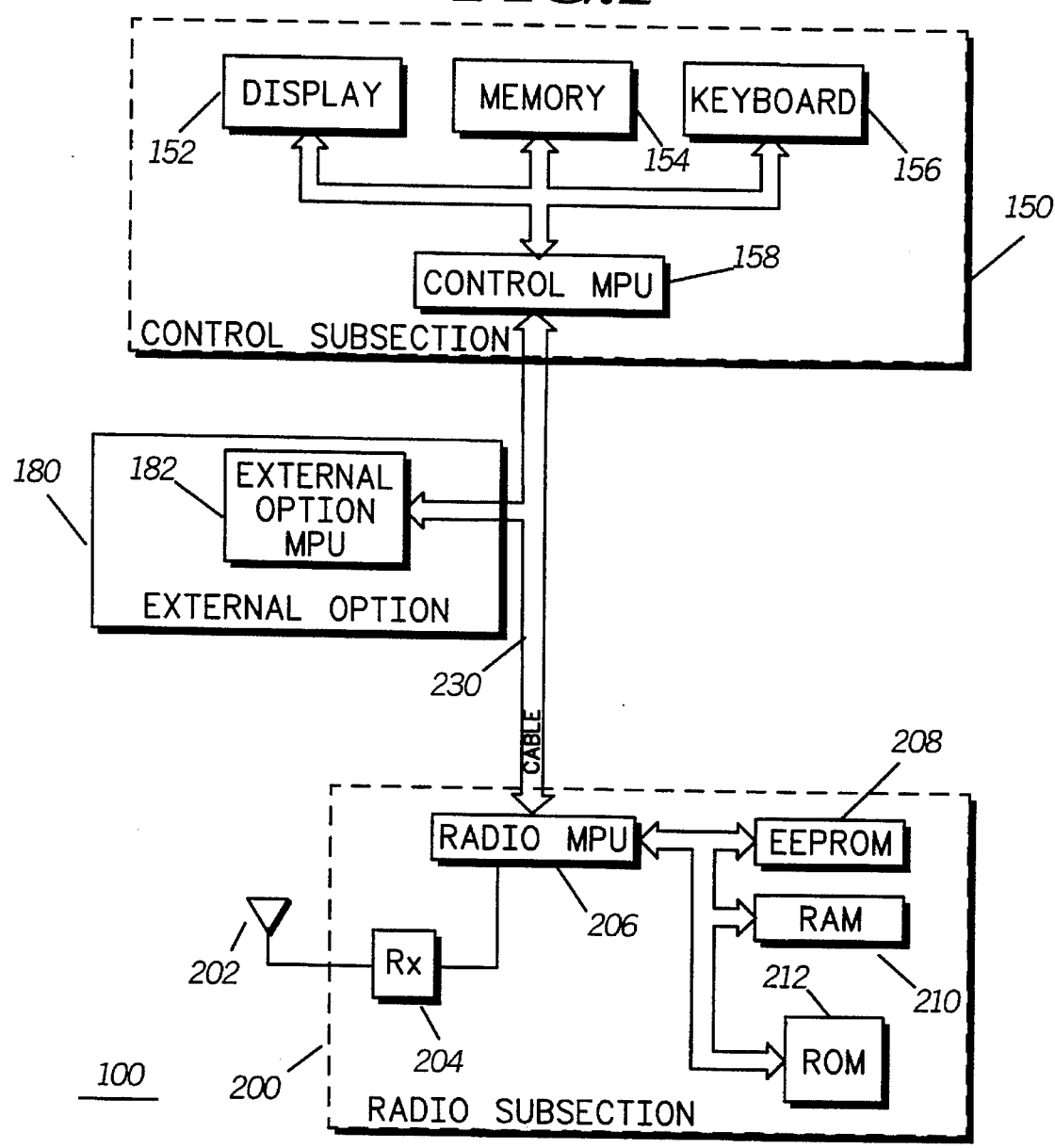
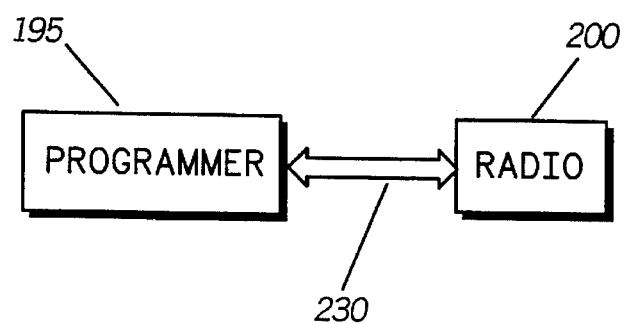

METHOD AND APPARATUS FOR COMMUNICATION VARIABLE LENGTH MESSAGES BETWEEN REGISTER MODELED RADIO DEVICES

This is a continuation of application Ser. No. 07/889,348, filed on May 28, 1992 and now abandoned.

FIELD OF THE INVENTION

This invention is generally related to communication devices and more particularly related to communication devices having a plurality of subsections.

BACKGROUND OF THE INVENTION

The need for this invention arose from problems of high speed communication between register-modeled radio devices. Current register modeled radio communication devices communicate to each other using communication protocols including fixed length information packets. With advances in component technologies, radio communication devices can now use memory components in sizes not previously feasible for portable or mobile radio applications. In particular, Electronically Erasable Programmable Read Only Memories (EEPROM) and Flash memories, are now available in sizes where the operating system of a communication device may be stored. In devices where the radio is programmed using register modeled protocols, a significant amount of time is required using fixed length message protocols presently available. The time requirement is due to significant overhead that is needed with fixed length messaging as presently available. These fixed length messaging protocols are described in U.S. Pat. Nos. 4,687,022 and 4,684,941. In order to substantially reduce the programming time of the radio, an improved register modeled system and a method of communication between the register modeled components, that would overcome the deficiencies of the prior art, is desired.

SUMMARY OF THE INVENTION

A radio system is disclosed comprising a plurality of addressable processors means and a communication means. The communication means includes a serial communication link for interconnecting the addressable processor means. The radio system also includes a first and a second communication protocols. The first communication protocol includes a plurality of fixed length information packets for passing parametric data to or from the addressable processor means. The second communication protocol includes a plurality of variable length information packets for passing parametric data to or from the addressable processor means at selectable speeds. Whereby the operating state of the addressable processor means may be determined or altered by, respectively, communicating parametric data from or to the addressable processor means.

BRIEF DESCRIPTION OF THE DRAWINGS

FIG. 1 is a block diagram of a register modeled communication system in accordance with the present invention.

FIG. 2 shows a very simplified block diagram of a programming subsystem in accordance with the present invention.

DETAILED DESCRIPTION OF THE PREFERRED EMBODIMENTS

Figure 3:
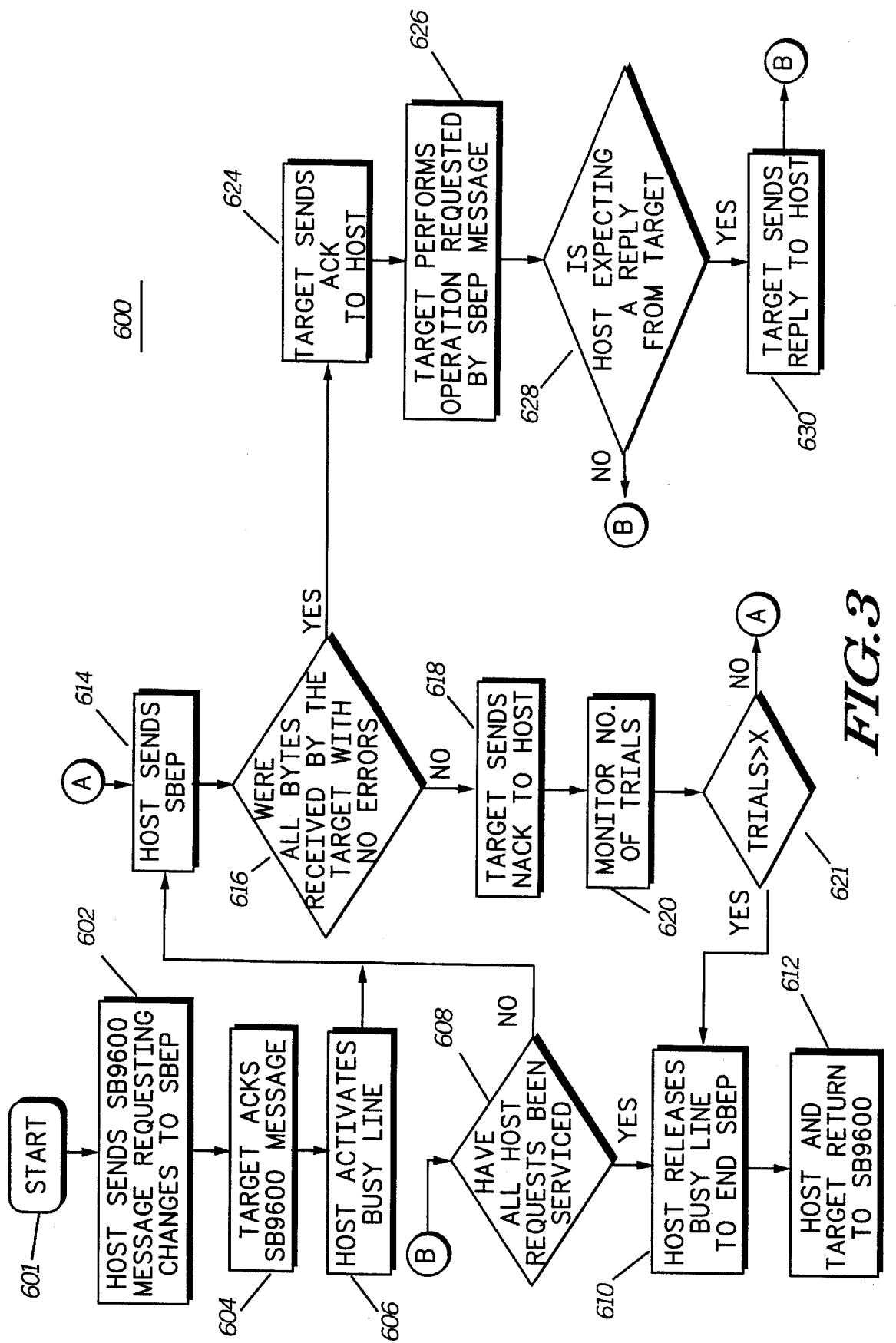
FIG. 3 shows a flowchart of a method used to change communication protocols in accordance with the present invention.

Referring to FIG. 1, a radio communication device 100, having a set of defined addressable subsections in accordance with the present invention, is shown. This figure shows a conceptual architecture for integrating current and future system options and command/control subsystems with common linkages into a structured unified two-way mobile or portable radio system.

Three subsections, a control subsection 150, an external option subsection 180 and a radio subsection 200 are shown. These subsections provide the register modeled addressable processor means of the present invention. These subsections are viewed as register modeled processors since they may be viewed as registers so far as their intercommunication is concerned. The contents of these subsections can then be used to define the operations that the radio device 100 is to perform. The virtual state of the device 100 and/or the subsections 150, 180, and 200 may be determined or altered, respectively, by communicating information to and from the plurality of subsections. This communication is carried via a serial bus 230 in accordance with the present invention. This basic structure provides the radio system 100 the capability of having a multiplicity of various radios, functions, features and enhancements in a single radio system without unnecessary redundancies.

Each subsection includes a microprocessor unit (MPU) and one or more registers comprising memory components. The control subsection 150 includes a control MPU 158, a display 152, a key board 156 and a memory component 154. The keyboard 156 includes any of the combination of numeric, alphanumeric, function keys, or feature activation keys such as Push To Talk (PTT). The external option is shown to include an MPU 182. Other registers may be added to this subsection as the need arises. The radio subsection 200 includes a receiver 204, an MPU 206 and several memory components 208, 210, and 212. These memory components are coupled to the MPU 206 via bus 214 including control, address, and data lines. The MPUs 158, 182, and 206 are preferably addressable so as to provide the communication system 100 with one to one communication between its subsections 150, 180, and 200.

To manipulate the contents of any of the memory components in the subsections 150, 180, and 200, a set of operation codes (Op Codes) has been defined. These instructions are used for data transfer and system control. These Op Codes comprise reset, read, write (alter), bit set, bit clear, acknowledgment (ACK), and negative acknowledgment (NAK). These Op Codes are transmitted over the serial bus 230 to cause data to be written into, read from, modified, or tested with respect to any addressed register in any of the subsections.

The functions of the various subsections are controlled by the contents of messages communicated on the serial bus 230. These messages may be single instructions or combinations of similar primitive functions (macros). This feature provides the capability for a subsection to respond to new "commands" without actually implementing new command Op Code. This enables the primitive instruction set to remain stable, promoting upward compatibility of peripherals 180.

The radio MPU 206 directly interfaces to the receiver 204 and an optional transmitter and performs many of the low-level tasks associated with a particular receiver. These tasks may include synthesizer control for the generation of operating frequency, transmit power level control, audio muting, channel scanning, receive/transmit and transmit/ receive sequence timing, a sub audible signaling generation and detection (PL/DPL codes), hardware diagnostics, etc.

The radio MPU 206 also provides an interface to the serial bus 230 where each of the relevant tasks are available to the control MPU 158 or other MPUs 182. These tasks include memory interrogation, programming instructions, display message handling, keyboard message handling, etc.

The control MPU 158 provides the human interface to the radio system 100 plus commands to all subsections 180 and 200. Its functions include the control of the display 152, displaying to the user data and status information received on the serial bus 230 or locally generated. The MPU 158 also receives data and control information from the keyboard 156 and selectively routes them to the display 152 or the bus 230 for further processing by other subsection MPUs.

Any and all unique parameters of the radio system 100 such as frequency information, Unit ID codes, PL/DPL codes, mode linkages, scan lists, etc., are provided to all system peripherals by the radio processor 206. It provides the database of the system 100 and transfers this information over the bus 230 for other MPUs to monitor. An example is provided by the PL/DPL drivers resident on the radio MPU 206. The total set of possible codes for PL and DPL may be hard programmed in the EEPROM 208 or ROM 212. This data base of the EEPROM 208 and the ROM 212 will be accessible from the serial bus 230 to other MPUs requiring the information.

Analog control functions, such as, volume and squelch may be controlled from the keyboard 156 in digital or analog form. Analog signals representing these control functions may be directly coupled from the keyboard 156 to the radio 200 via direct signal lines, not shown. Alternatively, analog signals may be converted to digital form by an Analog to Digital Converter (DAC) in the control MPU 158 and then sent to the radio 200 on the serial bus 230. The display 152 is controlled by the control MPU 158 and is accessible via bus 230 by other MPUs in the system 100 for status and monitoring purposes as well as keyboard entry feedback.

The external option MPU 182 provides the support for the option 180 and expansions of the radio system 100. Major communication functions, such as radio and control unit programming, digital voice storage, telephone signaling, multi-frequency and single frequency trunking, etc., are all examples of the functions that may be supported by the external option subsection 180.

The serial bus 230 provides the physical interface of all MPUs 158, 182, and 206 in the radio system 100. It consists of a 3-wire link (signal, busy, and ground) and may be bussed to other internal or external subsections, not shown. When used externally, the cable may be twisted-pair, shielded-audio or fiber-optic. The link may also be remotely coupled via infrared, ultrasonic or RF. Specific applications may add to these requirements. In a mobile radio application, for instance, the signal line may be split into balanced signal+/signal– lines, also commonly referred to as bus+/ bus– lines to form a complementary signal for noise rejection. The signal line(s) is the bi-directional line where the actual serial data is transmitted and received. In the SB9600 mode, the bi-directional BUSY line is used to indicate when data is on the signal line. It indicates when the start and end of a transaction take place and is also used to indicate a NAK. In the preferred embodiment, all subsections; internal or external, tapping into the signal and busy lines use a "wired OR" configuration.

The serial bus 230 may be used anytime a communication need exists among MPUs 158, 182, and 206 in the system 100 or between any of these MPUs and an external MPU(s). In the SB9600 mode, communication between MPUs occurs using serial data transmitted at 9600 Bits Per Second (BPS) on the bi-directional serial bus 230. The architecture is general enough that many different applications can be envisioned. Access to the various processors in the system is obtained via the bi-directional data line and a bi-directional busy line using techniques similar to CSMA/CD (Carrier Sense, Multiple Access with Collision Detection) which is frequently employed in computer Local Area Networks, known in the art.

The communication conducted on the serial bus 230 utilizes two protocols. Initially the SB9600 fixed length protocol, which is understood by all the subsections, is used. A second protocol, Serial Bus Expanded Protocol (SBEP), may be used by two MPUs at a time. When wishing to use the SBEP protocol a message is sent from the originating MPU (host) to the receiving MPU (target) using the SB9600 protocol requesting a change to the SBEP mode. This message is sent via a fixed length information packet. The receiving unit proceeds to heed the instruction of the fixed length information packet. In the preferred embodiment, this information packet requests the receiving unit to switch to a second mode of operation, SBEP. Once in this mode, variable length messages may be communicated at various baud rates, significantly speeding up the communication between the subsections. The protocol switching along with other features of the SBEP protocol are explained later.

In order to provide a better understanding of the present invention, a summary of the features of the SB9600 protocol are presented here. This protocol is not to be confused with SBEP protocol which will be discussed in full detail later.

A device accesses the bus by first checking to see that the BUSY line is inactive (also called "free"). If it is not free, the device must wait a period of time before trying again. If it is free, it must immediately pull BUSY active, transmit on the BUS line, and then release the BUSY line.

The basic building block upon which the SB9600 is built is the 8 bit data byte. The data byte with the start and stop bits (10 bits total) is referred to as a "data packet". These packets are concatenated to form a single "message". Messages typically consist of:

an op code packet, address packet, data (argument) packets, and a CRC (Cyclic Redundancy Code) packet The two types of messages allowed in the system 100 are Requests and Broadcasts. Requests are used to obtain information from other processors in the system. A Broadcast is either a response to a specific Request (solicited Broadcast or Reply) or is spontaneously generated and sent to all devices in the system (unsolicited Broadcast), such as when a button is activated.

The BUSY line in the serial bus 230 is a bi-directional line which mainly serves to indicate when a message exists on the bus. Before a message can be sent on the bus, a device desiring to transmit must first check to see if the BUSY line is active. If it is not active, the device pulls the BUSY line active and sends the message. If a device expects a response to its transmission, the BUSY line must be released after receiving the first byte of the Reply or a timer expires. If a response is not expected, the BUSY line must be released after sending out the last packet of the message. The BUSY line is also used to formulate and test for a NAK.

When a message has a CRC error or if an interpacket delay violation occurs, the receiving device must immediately pull the BUSY line active. After sending the Broadcast, the original transmitter will release and then sample the BUSY line to see if it is still held active, indicating the message was not received correctly. If BUSY is still held active, then the message is being NAKed and the original transmitter may send the message again. It should be noted that during retransmissions, BUSY never changes state (always active). Once a valid message has been received, all subsequent messages should be ignored until BUSY changes state.

Errors occur due to outside noise sources, collisions, or improper system utilization. Errors in data transmission are detected by the CRC, by timing violations, or by detecting a collision. Detection of collision is accomplished by monitoring the transmitted information at the MPU of the originator. When such an error occurs, a negative acknowledgment (NAK) is sent. A NAK consists of pulling the BUSY line active during the "NAK period" following a Broadcast. The mere presence of an active BUSY in this time interval indicates that at least one listener detected an error. A NAK will cause any Broadcast to be retransmitted.

If noise corrupts the bus or if two or more MPUs take control of the bus at the same exact time, then the received CRC will not be the one expected. While transmitting, each packet must follow the previous packet within 1 packet time (interpacket delay). If an "interpacket delay violation" occurs, the receiver must immediately NAK. Any time an interpacket delay violation occurs, the received message must be disregarded and the receiver re-initialized to receive a new message.

Each option, control head and radio in the system has assigned to it a group and device address. No two options can have the same device address and group. Device addresses are sent out with a message when it is necessary to specify a particular device.

Referring to FIG. 2, a programmer 195 is coupled to the radio 100 via the serial bus 230. The radio 200 may be programmed using the programmer 195 and the SBEP protocol in accordance with the invention. The radio 200 is shown coupled to the programmer 195 via the serial bus 230 in accordance with the present invention. The programmer 195 is coupled to the radio 200 as the external option 180. In this embodiment, the programmer 195 operates as the host, for it generates programming messages in the form of information packets. The radio 200, on the other hand, functions as the target, for it receives and performs the programming commands issued by the programmer 195.

In programming the radio 200, the programmer 195 requests a change in the communication protocol using SB9600 protocol, the first and fixed baud rate communication protocol. The radio 200, in other words, is sitting idle, expecting to receive SB9600 information from any of the subsections operating on the bus 230. The radio 200 acknowledges the receipt of the protocol change request to the programmer 195. With this acknowledgment, both the programmer 195 and the radio 200 switch to the SBEP mode, the second and the variable length communication protocol. With both the programmer 195 and the radio 200 in the SBEP mode the programming commences. The programming information communicated from the programmer 195 are information packets comprising sub-packets. These sub-packets include a variable length Op Code sub-packet, a variable length message size sub-packet, a data sub-packet, an address, an error detection sub-packet, etc. A more detailed description of this handshake and programming is described by referring to the flow charts of FIGS. 3 and 4 which describe the entry to SBEP mode.

Referring now to FIG. 3, a flow chart is shown of the procedure used by the programmer 195 to conduct a successful changeover and communication on SBEP. The programming of the radio 200 uses the communication portion of the flow chart 600. Furthermore, this programming results in the altering of the virtual state of the radio 200. From a start block 601, the host sends an SB9600 message requesting a change over to SBEP mode, via block 602. The radio 200 acknowledges the receipt of this SB9600 message by not NAKing the message. This acknowledgment (lack of NAK) indicates that the radio 200 received a message without error, via block 604. The output of block 604 is coupled to a block 606 where the programmer 195 activates a busy line. This busy line is used to inform other devices to stay away from the serial bus 230 while the programmer 195 is communicating to the radio 200. With busy line activated, host sends SBEP messages, block 614.

From block 614, a condition block 616 determines whether any errors where received in the SBEP messages from the programmer 195. The NO output indicating that messages communicated from the programmer 195 to the radio 200 where received with errors is coupled to a block 618 where radio 200 sends an SBEP negative acknowledgment message (NAK) back to the programmer 195 indicating that some errors were detected in the received message. This negative acknowledgment is an SBEP NAK which is a data byte as any other message communicated in the SBEP mode. The detection of errors may be accomplished via any of several available methods well known in the art. In the preferred embodiment, the checksum error detection is used where checksum packets are communicated. Other error detection techniques such as, Cyclic Redundancy Check (CRC) packet may be substituted for checksum packets with equal or better error detection performance. As part of the operation of block 618 the number of NAK trials is increased by one. The number of times a NAK is sent from the target to the host is monitored next, via blocks 620 and 621. Blocks 620 and 621 are implemented to limit the number of trials when a significant problem exists in the link between the radio 200 and the programmer 195 that corrupts the messages as they are communicated. This problem may be a physical one in the serial bus or noise inflicted on the link, both causing repetitive errors. The number of trials are selected based on the characteristics of a particular system. In the preferred embodiment three trials are tolerated before a flag is raised indicating high number of trials with error. The high number of errors produces the YES output of the condition block 621 which is coupled to the block 610 where the host releases the busy line and terminates SBEP mode. At this point a new change request must be sent from the host to reinitiate the change over from the SB9600 to the SBEP mode.

The YES output of the condition block 616 is coupled to block 624 where an acknowledgment (ACK) is sent from the radio 200 to the programmer 195. It is understood that the number of trials is set to zero at this point or at any point prior to block 614. The path coupling blocks 616 and 624 includes a block which clears the number of trials, not shown. Once the ACK has been sent back, the radio 200 will perform the operation requested by the SBEP message, via block 626. In the specific case of programming, the radio 200 proceeds to receive the programming information from the programmer 195 and stores them in the RAM 210 and the EEPROM 208.

Block 626 is coupled to a condition block 628 where a decision is made as to the requirements of the programmer 195. Depending on the kind of message that was communicated to the radio 200 a new reply may be expected. In general, a reply is required when a request has been transmitted by the host. A broadcast, however, does not require a reply. More detail on various types of messages will follow. The condition block 628 determines whether the communicated message requires a response from the radio 200. The YES output is coupled to a block 630 where the radio 200 sends back a reply to the programmer 195. From this block, the operation is coupled to a condition block 608 where a decision is made as to whether all host requests have been serviced. The YES output of block 608 is coupled to block 610 where the host 195 releases the busy line to indicate the termination of the SBEP mode. A block 612 follows returning both the host and the target to the SB9600 mode. The NO output of the condition block 608 is coupled back to block 614.

Although in programming the radio 200 it may not be necessary for the radio to respond to the host with a particular information packet, in other aspects of the invention it is well understood that the programmer 195 may indeed be requesting for information from the radio 200. One such application is a read command issued by the programmer 195 which requests that a portion of the memory, in any of the subsections of the radio system 100, be transferred back to it. In this situation, it can be seen that the radio 200 proceeds to transfer back the contents of its memory to the programmer 195. Once a reply has been sent back to the programmer 195, the operation return to the condition block 608 to determine if the last of the requests from the host have been serviced. The NO output of the condition block 628 is also coupled back to the condition block 608.

A significant aspect of the flow chart 600 is that the messages sent back and forth between the programmer 195 and the radio 200 can enjoy variable length and hence each message may include a complete request from the programmer 195 or a complete response from the radio 200. This is significant as opposed to presently available systems where fixed length messages are communicated back and forth resulting in a significant overhead on the communication protocol. The variable length advantages offered by the SBEP protocol allow a radio communication device to be programmed in a significantly shorter period of time as compared to presently available schemes. Another benefit of the present invention is that radio communication devices may now be efficiently programmed in the bootstrap mode.

Figure 4:
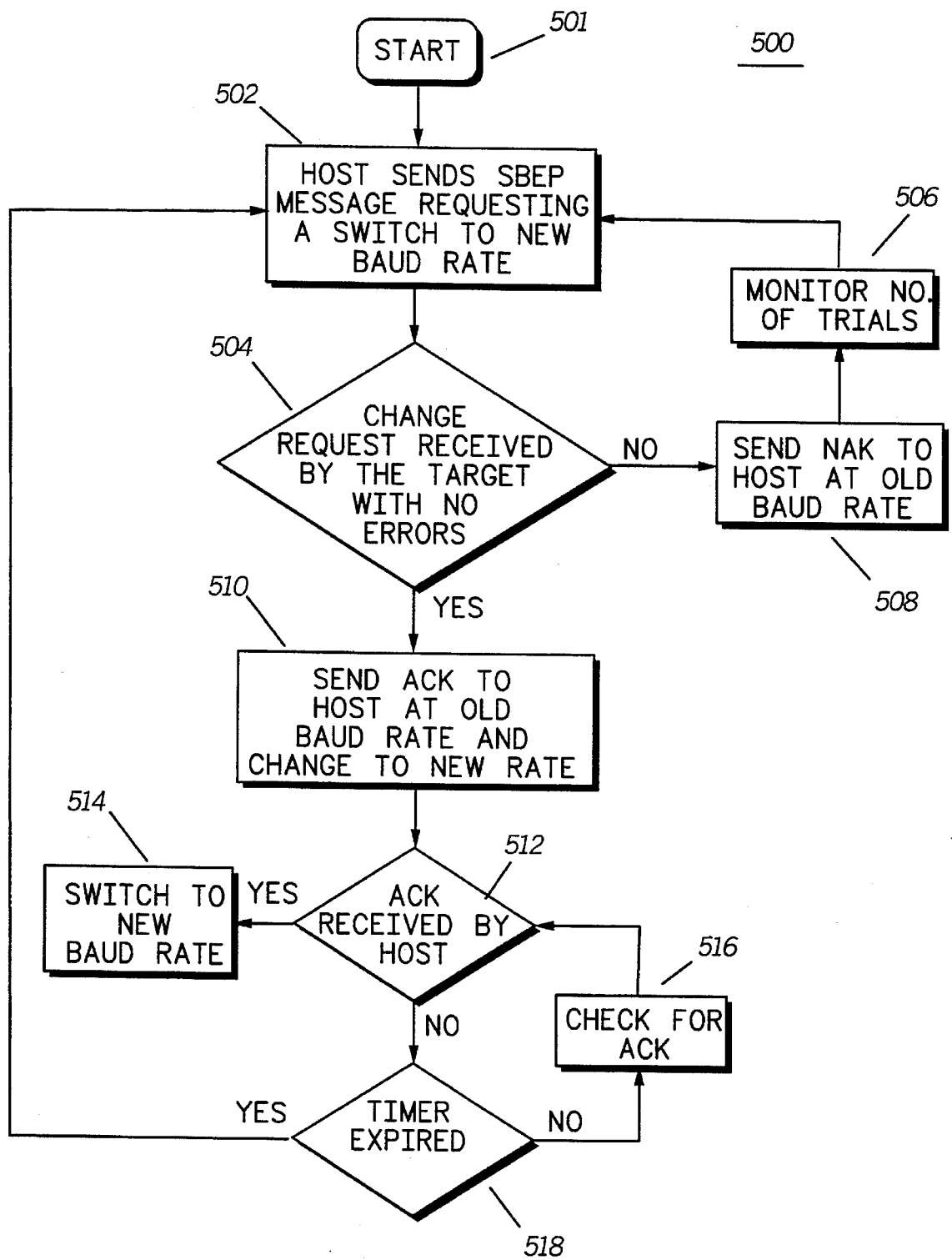
FIG. 4 shows a flowchart of a method used to change the communication baud rate in accordance with the present invention.

Referring to FIG. 4 and flow chart 500, a method of changing the baud rate used in the communication protocol between the register-modeled components of the radio system 100 in accordance with the present invention is shown. From a start block 501, the host sends an SBEP message requesting a switch to a new baud rate, via block 502. As can be seen, the block 502 assumes that the host has already requested a switch over to the SBEP mode and that both the programmer 195 and the radio 200 have already switched to this mode of operation. Once a baud rate switch message has been sent, a condition block 504 determines whether the baud rate change request was received by the radio with no errors. The NO output, indicating that errors were discovered, is coupled to a block 508 where a negative acknowledgment (NAK) is sent from the radio to the host at the old baud rate. The output of block 508 is coupled back to block 502 via a block 506 which monitors the number of trials. Block 506 monitors the number of trials in order to detect non sporadic errors in the communication link 230. The YES output of the condition block 504 is coupled to block 510 where an acknowledgment (ACK) is sent back to the host at the old baud rate and the baud rate is changed to the requested new one, at the radio. The output of block 510 is coupled to a condition block 512 where a question is asked as to the condition of the ACK received by the host. The YES output of the condition block 512 is coupled to a block 514 where the host switches to the new baud rate. The NO output of the condition block 512 is coupled to yet another condition block 518 where a timer is monitored. This conditions block questions the expiration of the timer. The YES output indicating that the timer has expired is coupled back to the block 502 where the host sends a second request to change the baud rate. A NO output which indicates that the time allotted for the host to receive an acknowledgment has not expired, hence, block 516 causes the host to check for the acknowledgment. The output of block 516, returns to the condition block 512 where the reception of an ACK is questioned.

It can be seen that with the flow chart 500, the baud rate of the communication between two components can be changed without any hardware interactions. In the preferred embodiment, high baud rates are desired since the programming of the subsections of the radio system 100 requires that large amounts of data be transferred. It is understood that this baud rate change routine is not limited to programming and that it can be used for any transfer of data.

A significant benefit of the present invention is realized with the availability of FLASH EEPROM. With the availability of these memory components storing firmware in electrically erasable memory is no longer out of reach and easily feasible. However, with existing communication protocols the time to program a large memory component, namely a 256 kilobyte device, would be excessive and not efficient. Furthermore, available protocols, such as SB9600, restrict the address range with their fixed address field. The benefits realized by the present invention are that no constraints are imposed by the baud rate of the SBEP protocol, hence the speed with which a memory device is programmed via a serial bus can be significantly improved. Furthermore, because of the enhancement in the addressing capabilities offered by SBEP, devices up to 16 megabytes and even higher may be programmed using this new protocol. The memory programming time can be expected to be reduced by a factor of 10 using variable length messages. This is mainly accomplished by having the benefits of sending large amounts of data with a small overhead, rendering the protocol highly efficient. One other benefit of the present invention is that of updating the display of a radio when using a serial bus. When using this protocol, it can be once again realized that by using variable length messages and variable baud rates, the efficiency of displaying information on the display can be significantly improved.

In the preferred embodiment, the SBEP is used to achieve high data transfer rates between options on the serial bus or between an external computer and the main processor of the radio or its options. It is intended for one to one communications between nodes on a serial bus or from the host to options that may or may not be connected. The messages consist of Requests, Broadcasts, Replies, Acknowledges (ACK) and Negative Acknowledges (NAK). Requests require a target to be connected, Broadcasts do not. Replies are only sent in response to a Request.

The SBEP achieves high throughputs by allowing a particular implementation to select what baud rate to use. The preferred embodiment supports rates up to 38.4K baud. It is well understood that higher rates utilizing faster platforms may be implemented. The protocol itself specifies most timing in terms of SCI byte times. Also contributing to the high throughputs is the variable byte count in SBEP messages and single byte acknowledgments.

In general, and in the preferred embodiment, the SBEP is a temporary serial bus "mode". The originator of SBEP, hereafter referred to as the host, will send an SB9600 message to one of the nodes on the bus identified by the group/address. The node targeted by the group/address, the radio 200, hereafter referred to as the target, is requested via this SBEPREQ message to perform SBEP. The target may not be present, in which case the host will proceed as there will be no SB9600 NAK. During this situation, only broadcast messages make sense. In addition to being able to enter the SBEP protocol from SB9600, it can be entered directly via bootstrap mode. In other words, the target will allow its internal processor to reprogram its firmware device (flash or UVEPROM) via SBEP messages over the serial bus. Since the firmware device is likely to be blank when the target is manufactured, this protocol in conjunction with algorithms written for bootstrap mode of the processor will allow the radio processor to write firmware into its program space device.

In order to demonstrate the performance details of the SBEP protocol, several timing and flow diagrams are referred to. These diagrams are intended to provide assistance in the understanding of some of the features of the SBEP protocol including switch over from SB9600 to SBEP. It is well understood that these diagrams represent the specifics of the preferred embodiment and shall not be construed as limitations on the invention.

Figure 5:
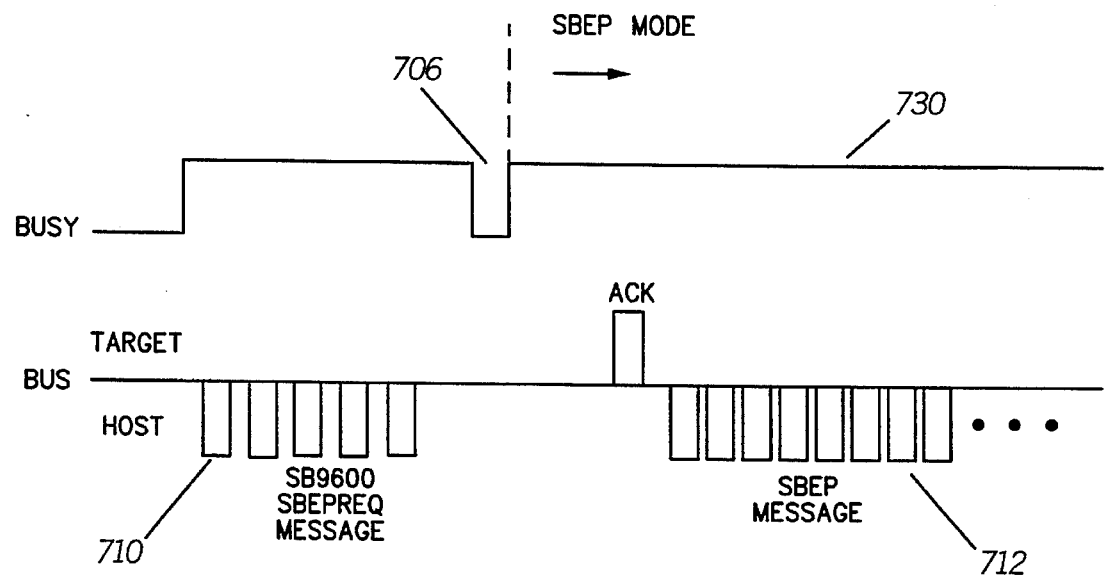
FIGS. 5, 6, and 7 show timing charts for a method of entering the Serial Bus Expanded Protocol (SBEP) mode in accordance with the present invention.

FIG. 5 shows a timing and flow diagram of the entry to the SBEP mode. When the processor in the target has firmware in its EEPROM, it will be operating in SB9600 mode. To change over into SBEP mode, there is an SB9600 op code that will instruct the target that the host wants to begin SBEP operation. The host will send an SBEPREQ SB9600 bus message 710. Following this request the busy line is released, 706, while checking for a NAK from the target. If a NAK is present, which is identified by a temporary high during the low state of period 706, the host retries. Retries followed by NAKs result in disallowance of entry into SBEP mode. If no SB9600 NAK is generated, then the host must pull "busy" line active again (730) and proceed to send SBEP messages 712. All other bus options will remain quiet after seeing the SBEPREQ op code and SBEP can proceed as long as the busy line remains active (730). If the target is not present, entry to SBEP will proceed as if it were present.

Upon entry to SBEP when a target is connected, it (the target) must ACK at the SBEP baud rate as soon as it is ready. The host should wait for this ACK for 5 SCI byte times at the SBEP baud rate, and if no ACK is seen after 5 SCI byte times the target may not be present. An SCI byte time is commonly defined as the amount of time required to transmit a byte (8 bits) of data plus a start and a stop bit at the operating baud rate. This initial ACK is used to tell the host that it may send a message right away rather than wait for the 5 SCI byte times. If the target is late to ACK and the host proceeds to send a Request or Broadcast, there will probably be a collision. When such a collision occurs and there is a target on the bus, the target will NAK the Request or Broadcast. The host is responsible for retrying as the target did not receive the full message.

If the target has no firmware to begin with, as is the case for a new radio, then the host cannot expect the target to be in the SBEP mode after issuing the SBEPREQ 710. The SBEPREQ 710 must still be issued so that other bus options are aware that SBEP is about to occur on the bus. Since the target is unreachable, the only means of communicating with the target is to put the target in bootstrap mode and to download bootstrap code to it. In the preferred embodiment, the microprocessor unit 300 is an MC68HC11 microprocessor. This processor must come out of reset with the MODA/B lines low in order to power up bootstrap mode. It is the responsibility of the host to insure that MODA/B are low when the target resets. Optionally the radio architecture may allow external control over the required lines for this to occur.

Figure 6:
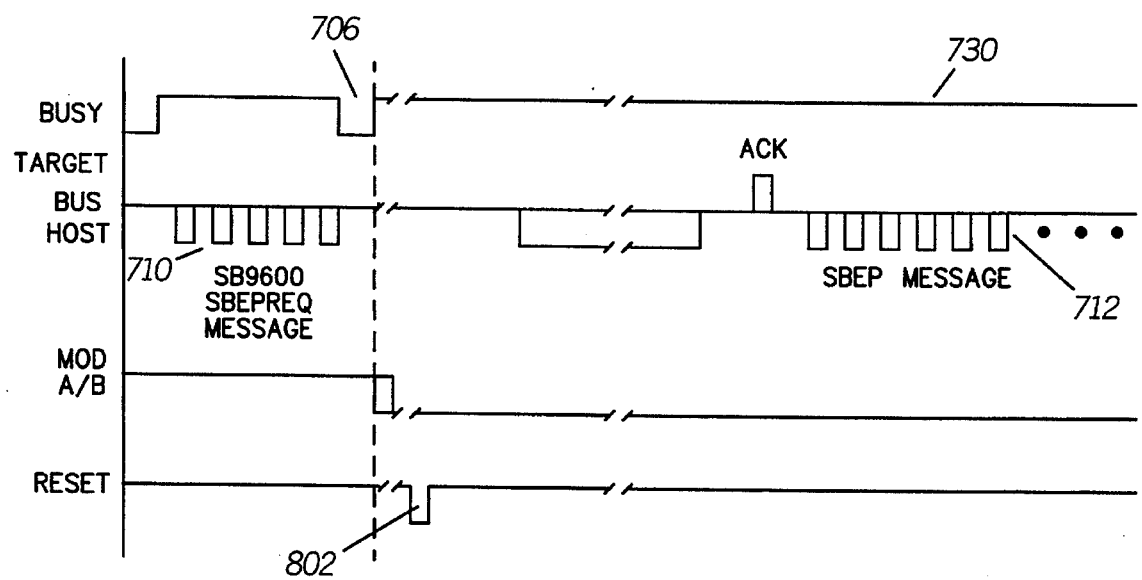

FIG. 6 shows entry to SBEP when target has no firmware. In other words, this figure illustrates the events necessary to put the processor in bootstrap mode. The reset pulse 802 cannot be generated through the use of an SB9600 message or SBEP message as the target cannot be instructed over the serial bus to reset. In a factory environment, the reset pulse 802 will be induced by automatically removing power from the target for a long enough period of time to cause a reset. In the field, however, this reset pulse 802 must be manually performed by the person operating the reprogramming equipment. Under normal circumstances, there may be few cases in the field when the operator must manually cause the target to reset.

Figure 7:
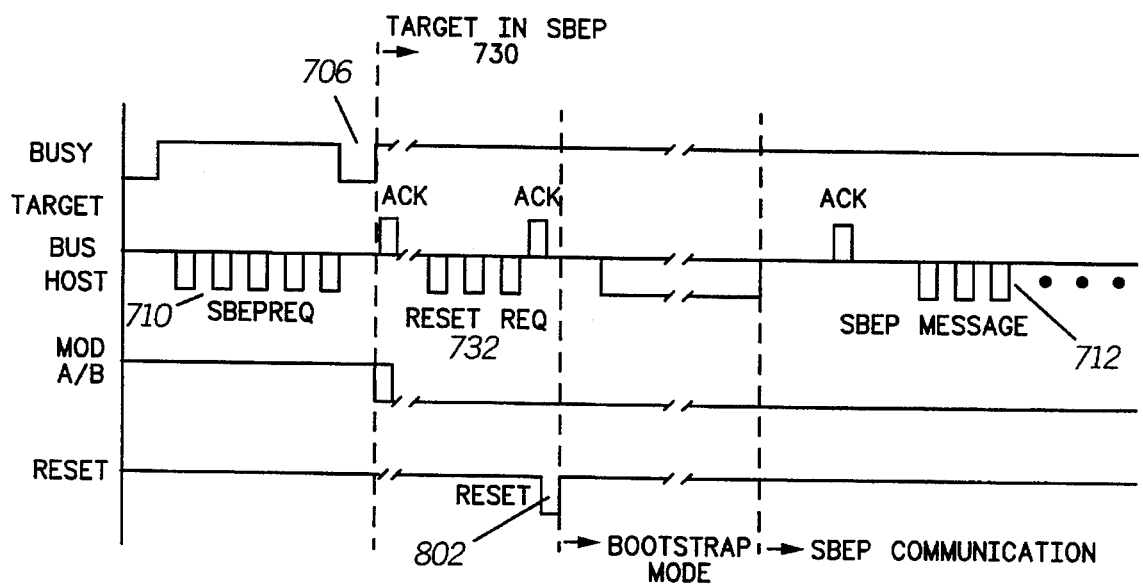

Note that the protocol for downloading the bootstrap code is dependent on the processor and its clock speed. For downloading information the reader is referred to MC68HC11 reference manual. The last case to consider for entry into SBEP is when the target has firmware to communicate via SB9600, but it must be put into bootstrap mode This is the case when the firmware of the target is to be upgraded. This entry procedure is illustrated in FIG. 7. Since the processor in the target has firmware in its ROM, it will be operating in SB9600 mode. To change over to SBEP mode, the host will send an SBEPREQ SB9600 bus message 710, and if the target receives it and does not generate an SB9600 NAK, then the host must pull 'busy' active (730). All other bus options will remain quiet after seeing the SBEPREQ op code and SBEP can proceed as long as the busy line remains active. If the target is not present, entry to SBEP will proceed as if it were present. The RESET-REQ op code is sent from the host to indicate that the target should generate it's own reset pulse, resulting in bootstrap mode.

Upon entry to SBEP when the target is connected, it (the target) must ACK at the SBEP baud rate as soon as it is ready. The host should wait for this ACK for 5 SCI byte times at the SBEP baud rate, and if no ACK is seen after 5 SCI byte times the target may not be present. This initial ACK is used to tell the host that it may send a message right away rather than wait for the 5 SCI byte times. If the target is late to ACK and the host proceeds to send a Request or Broadcast, there will probably be a collision. When such a collision occurs, there is a target on the bus, and it will NAK the Request or Broadcast. The host is responsible for retrying as required as the target will not receive the full message.

Figure 8:
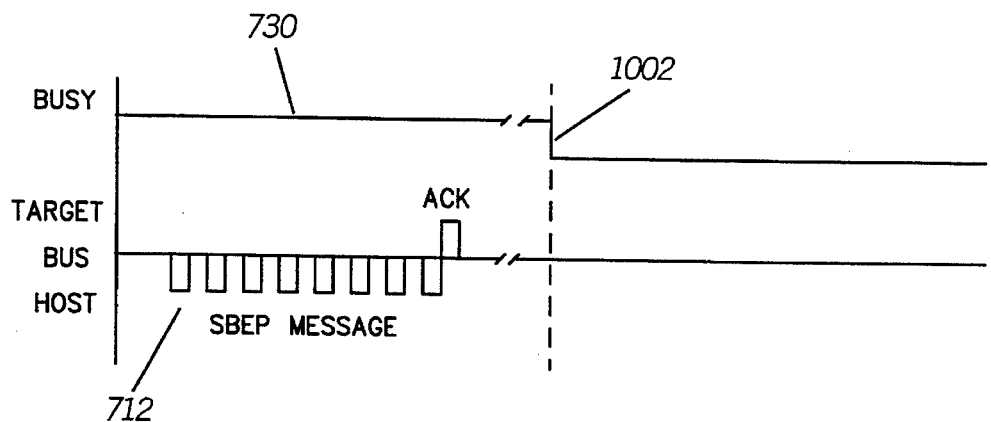
FIGS. 8, 9, and 10 shows timing charts of exiting from the SBEP mode in accordance with the present invention.
Figure 9:
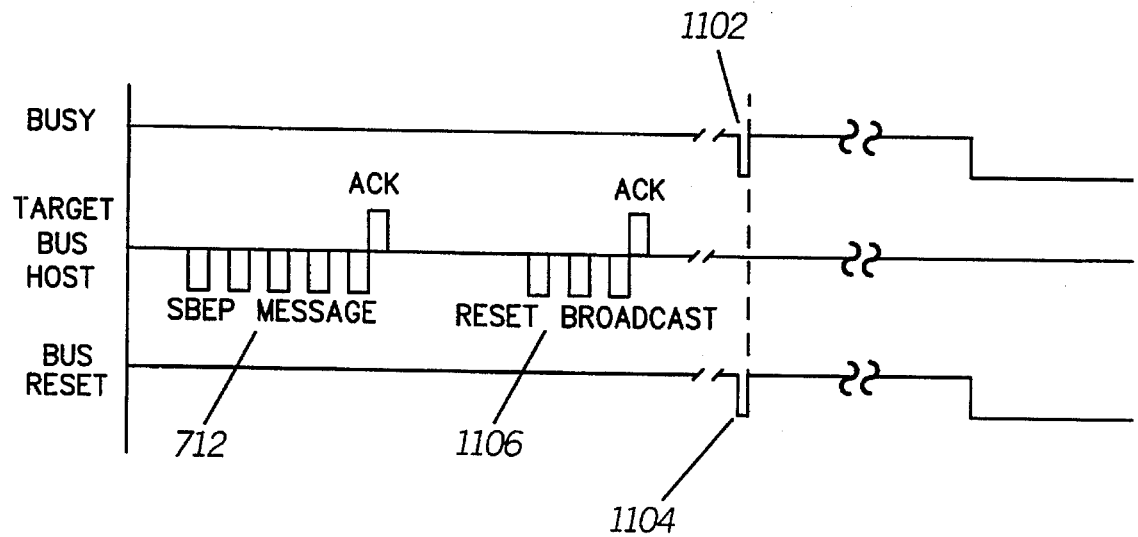
Figure 10:
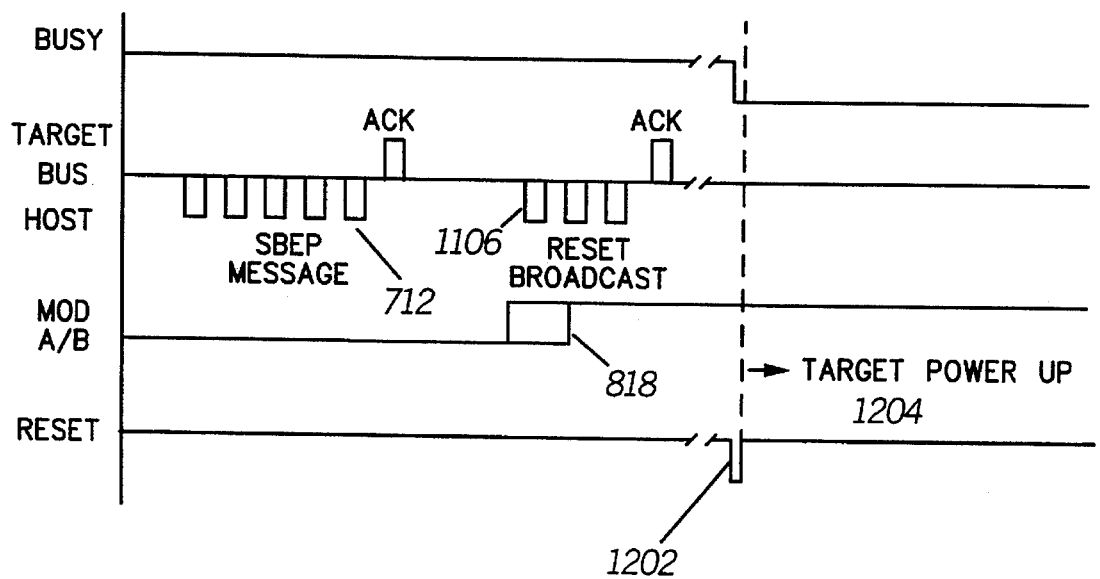

Referring now to FIGS. 8, 9, and 10, exit from the SBEP mode is illustrated for three different operating modes. When SBEP was entered from SB9600 and the target was not put into bootstrap mode, exit from SBEP can be achieved by releasing the busy line 1002. Once busy is released, the target processor must return to SB9600. This is illustrated in FIG. 8. All other bus options will observe busy to go high and reactivate themselves in SB9600 mode.

Alternatively, as shown in FIG. 9, the host may take the target out of SBEP by issuing it a RESET-BROADCAST message 1106. The RESET-BROADCAST message 1106 will cause the target to go through a reset and thereby power up operating normal SB9600 bus protocol. On the busy line the pulse 1102 shows a normal "power-on" busy state which is generated by the target processor. The rising edge of this pulse commences the power up of the target in the SB9600 mode. The pulse 1104 on the Bus Reset line is a normal 'power-on' type reset generated by the target processor.

As yet another alternative, as shown in FIG. 10, if the target was in bootstrap mode getting its firmware programmed, an SBEP RESET-BROADCAST message 1106 must be sent to the target, and the condition that allowed it to go into bootstrap mode originally must be removed (MODA/B set low). Busy must also be released. If the target has firmware to execute, then it will come up running SB9600 mode. Pulse 1202 represents the reset pulse caused by the cop time out in the target processor. Once again the target powers up in the SB9600 as indicated by the dashed line 1204.

The format of SBEP messages is very flexible in that messages can be of variable length starting from one byte up to $2^{16}+4$ bytes long. Practically speaking, the largest message length will be limited by the amount of RAM available in the target.

The first byte of the message always determines what is to follow. Table 1 illustrates the possibilities for the first byte and how it affects what subsequent bytes mean.

TABLE 1

| First byte of SBEP message | | |
|---|---|---|
| msn | lsn | Implication to reset of message |
| ($0–$E) | ($0–$E) | No extensions, count to checksum in lsn |
| ($0–$E) | ($F) | Two extended size bytes to follow |

TABLE 1-continued

| First byte of SBEP message | | |
|---|---|---|
| msn | lsn | Implication to reset of message |
| ($F) | ($0–$E) | One extended op code byte to follow, count to checksum in lsn |
| ($F) | ($F) | One extended op code byte, two extended size bytes to follow |

The first byte of the SBEP message is to be considered on a per nibble basis. That is, the first nibble or most significant nibble (msn) contains op code information and the second nibble or least significant nibble (lsn) contains information pertaining to the number of bytes to follow. Therefore, if the lsn is $0, there are no more bytes to follow, and all initial bytes that have $0 as the lsn are one byte messages. ACK and NAK are one byte messages and have no checksum.

The lsn of the first byte can take on values from $0 through $F. When the lsn is $0-$E it represents the number of bytes to follow in the particular message. When it is $F, it signifies that two additional bytes of extended size follow and they contain the message size.

The msn of the first byte is the op code. It can take on values from $0 to $F. When it is $0-$E, it is the op code. If it is $F, then there is an additional byte to follow that is the extended op code.

Combination three contains an $F in the msn, indicating that there is an additional op code byte to follow. The extended op code is not part of the count in the lsn as the extended op code is known to be there by virtue of the fact that the msn was $F.

There is always a checksum as the last byte of a message that contains a count in either the lsn of the first byte or in the extended size of 1 or greater. The checksum is calculated as follows:

checksum=$FF-((sum of all bytes in message)modulus 256)

Figure 11:
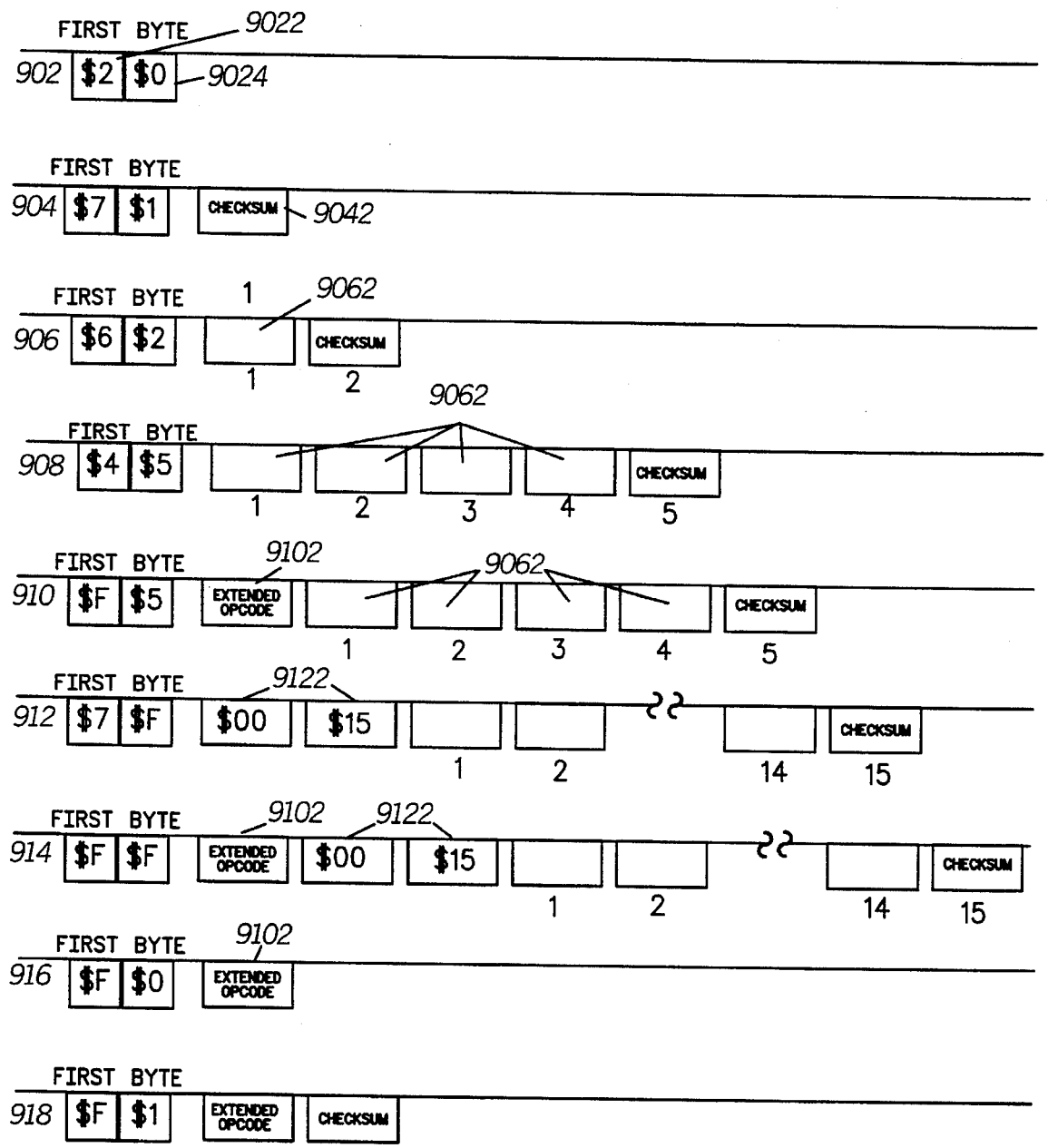
FIG. 11 show sample messages used in the protocol in accordance with the present invention.

FIG. 11 illustrates some sample messages of various sizes that are possible with the SBEP message format. The presentation of these sample messages is intended to provide the reader with a better understanding of the messaging used for the SBEP protocol. A single byte message 902 is shown to include a first nibble 9022 indicating a desired variable length operation code (op code). The second nibble indicates the number of bytes that follow including the checksum byte, if any. The variable length op codes may be one or more codes selected from the group of codes consisting of reset operation code, read operation code, write operation code, bit set operation code, bit clear operation code, acknowledge operation code, and negative acknowledge operation code.

Several multi-byte messages are shown in this figure to provide a wide range of different possibilities this messaging format provides. The multi-byte message 904 includes an op code and a byte count, represented by the first byte. The second byte is a checksum byte 9042 which is used for error detection purposes. Note that the content of the byte count in the second nibble is one indicating that a single byte is following the first byte. The multi-byte message 906 includes a data portion 9062. The data portion 9062 includes a single byte in this message. The count nibble indicates that two bytes of data including checksum are following. Similarly, the message 908 includes four bytes of data as indicated by the byte count.

The message 910 includes an extended op code 9102. The presence of an extended op code is indicated by $F in the first nibble. This $F indicates that the first byte after the count nibble is an extended op code. This is beneficial in performing a number of functions previously not available with the SB9600 protocol. The message 912 includes an $F in the second nibble indicating that an extended byte count 9122 is used. This extended byte count is used in situations where the number of data bytes are beyond the thirteen that are offered with a single nibble. With two count bytes available a total of 64K bytes minus one of data may be transferred at once. Those skilled in the art appreciate that in order to expand the size of the single message data transfer may be further expanded by assigning more bytes for the count. A combination of $F in the first and the second nibbles indicate that both an extended op code and an extended byte count are following. This is shown by the message 914. Message 916 shows yet another combination where an extended op code is used with no zero data count. Finally, the message 918 shows an extended op code followed by a checksum.

Messages 902 and 916 are single byte and multi-byte messages with no checksum, respectively. These messages are used in the preferred embodiment for acknowledgments, negative or positive. This is once again intended to minimize the messaging overhead that is encountered with the use of checksums.

In the preferred embodiment, the SBEP protocol relies on the concept of there always being a host and a target. The host is defined to be the initiator of SBEP, i.e. the device that initially sent the SB9600 SBEPREQ message. For the entire session of SBEP, there will only be one host. The target is the device whose address was in the initial SB9600 SBEPREQ message. The target can only generate ACKs, NAKs in response to a Broadcast from the host, and ACKs, NAKs or Replies in response to Requests from the host. For the duration of an SBEP session (the entire time busy is held low) the host remains in control and must initiate any messages. The target remains the 'slave' and only responds to messages sent by the host. The radio can be the host or the target for a session of SBEP. Host messages are classified into two categories based on what kind of acknowledges are required. They are Broadcasts and Requests. Target messages are ACKs, NAKs and Replies. A discussion of each follows.

Figure 12:
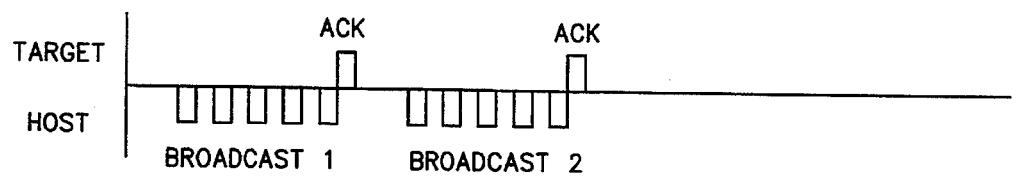
FIGS. 12 and 13 show broadcasts in accordance with the present invention.
Figure 13:
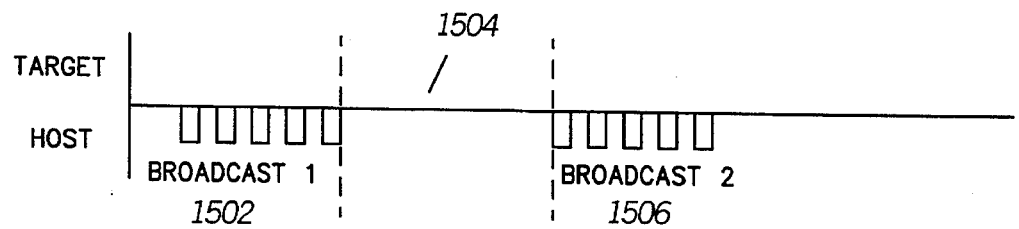

Referring to FIGS. 12 and 13, the timing diagrams for two instances of SBEP broadcasts in accordance with the present invention are shown. As stated earlier, broadcasts are messages sent from the host with no specific target information. Broadcasts are initiated from the host and do not require an ACK or a NAK, but will accept one if it is present. They are intended to be used when the radio initiates SBEP as a host to inform the outside world of events occurring in the radio. Since a target may or may not be connected, an ACK or NAK is not required for a Broadcast. A host that initiates a Broadcast must be aware that ACKs/NAKs are optional.

For broadcasts, the target need not be connected. The SBEP has been designed to work in a half-duplex, no hardware handshake environment, and is therefore not as robust in its error recovery as it could be otherwise. The protocol is designed so that when writing data to the target, the download baud rate or the program time to the device in the target is the limiting factor to the throughput.

If there is a target connected, it must ACK or NAK a broadcast. If the target ACKs then the host may send another message if it so desires. FIG. 12 shows the situation when an ACK is sent back by the target. If the target NAKs, then there is positive confirmation that the Broadcast did not get through, so the host must retry up to four times until an ACK is seen or no ACK/NAK is seen (case when the target was removed half way through a retry).

Referring to FIG. 13, If there is no target connected, then the host will never see an ACK or a NAK. Since the host does not know if there is a target connected after sending the first broadcast 1502, it must wait 10 SCI byte times to see if an ACK or a NAK appear on the bus. If the host does not see anything in 10 SCI byte times (1504), it can assume no target is connected, and proceed to send another broadcast, 1506. Obviously, the host should never send a Request after realizing that there is no target connected. If it does, it will go through a retry sequence and never see an ACK/NAK or reply. If the target does ACK a broadcast, that is all it must do.

Requests are initiated by the host and require an ACK or a NAK. If the host does not see either, it must conclude that no target is connected, and that Requests no longer make sense. This would be the case if the target was removed half way through an SBEP session. Requests always require some sort of Reply. They will be sent to the host from the target after the ACK. The host is not allowed to send another Request or Broadcast until the Reply for the last Request is seen.

Figure 14:
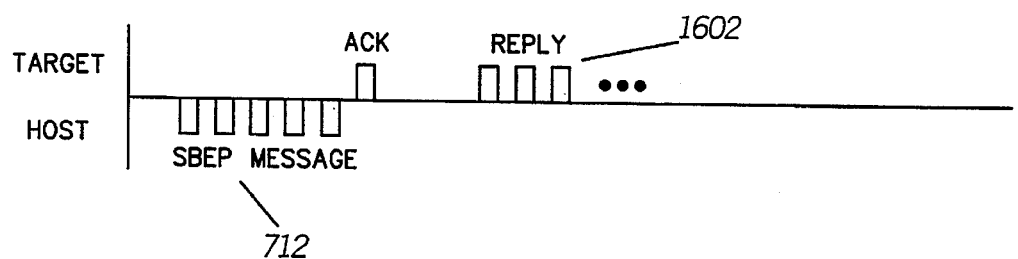
FIG. 14 shows an SBEP reply in accordance with the present invention.
Figure 15:
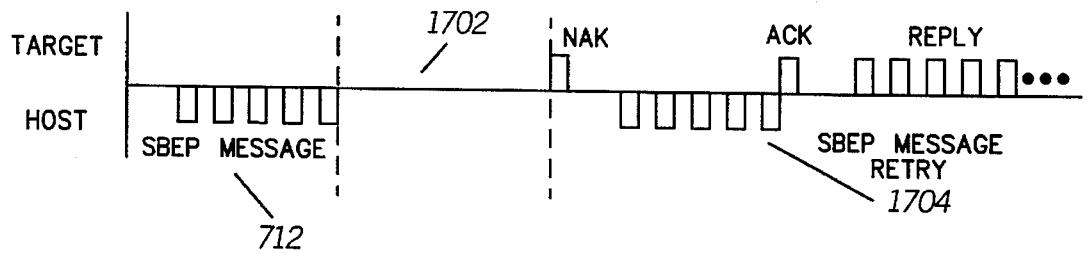
FIGS. 15 and 16 show retry timing charts in accordance with the present invention.
Figure 16:
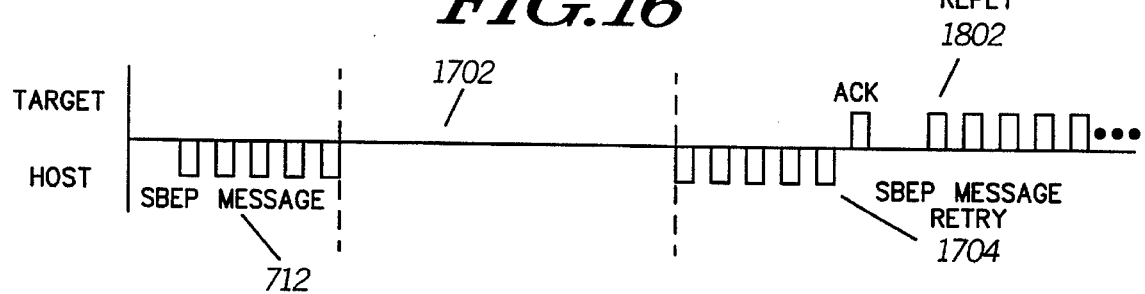

ACKs and NAKs are sent by the target to the host to any message (Broadcast or Request) seen. ACKs can be sent immediately by the target once a correct message checksum is received. An ACK serves to tell the host that the message (Broadcast or Request) was received correctly by the target, and that the host should not retry. ACKs are only sent from the target to the host, never from the host to the target. ACKs and NAKs are shown in FIGS. 14, 15, and 16 for cases when target ACKed, NAKed, or did not send any responses, respectively ACKs must be sent within a 10 SCI byte time window after the checksum is received by the target. Typically, a host will be able to send this ACK almost immediately. NAKs are sent by the target to the host when a corrupted message is received by the target. A bad checksum or incorrect count of bytes will cause the target to perceive a bad checksum and set up to send a NAK. Since the bus is bi-directional a NAK cannot be sent immediately like the ACK because the bus may be busy sending more bytes even though the target already decided that it was going to NAK (as would be the case if the count byte is corrupted).

NAKs must be sent 5 SCI byte times after the bus has gone idle. That is, the host could continue sending a message, but the target must wait until the bus is idle for 5 SCI byte times. This is shown in FIG. 15. The NAK must be sent before 10 SCI byte times from the last byte go by. This time limit (1702) is required so that the host knows when to retry. Whenever the target sends a NAK, the host must retry (1704) up to four times. If the host continues to see NAKs it should conclude the physical medium is too noisy for communications to take place.

There is a possibility that the target will send back an ACK or a NAK to the host, but it got corrupted on the bus while on its way to the host. In this case, the host should conclude that the target did not receive the last message correctly, and retry the last message, FIG. 16. This retry 1704 can only occur after 10 SCI byte times after the checksum for the last message was sent, 1702 in FIG. 16. In the case that the host sent a Broadcast (which doesn't require an ACK or NAK), and there was a glitch on the line in the 10 SCI byte time window after the checksum, the host will think there was a target connected and that its ACK or NAK was corrupted. In this case, the host must retry the Broadcast until it gets an ACK/NAK or nothing in the 10 SCI byte time window. Note that the possibility exists that the target will proceed to send a Reply 1802 when the host is about to retry the last Request. In this case, there will be a collision. The host must recognize that a desired reply was corrupted, and resend the last Request.

Referring once again to FIG. 14, it can be seen that Replies 1602 are sent by the target to the host in response to a Request and only after an ACK was sent. The host will not send an ACK/NAK back to the target if the reply was corrupted on its way back to the host. In this case, the host must resend the last Request. If the op code in the Request is not supported by the target, the target must still ACK (since the ACK only signifies that the message made its way to the target).

In order for the bus timing to work correctly, the host must never pause more than 5 SCI byte times while it is transmitting a message. If the host does pause for longer than 5 SCI byte times, the target will be free to NAK as it will appear like the host stopped midstream through a message. During a reply, the target may not pause for over 5 SCI byte times between bytes.

In order to increase the throughput of the protocol, the baud rate may be changed for SBEP messages. The initial SBEPREQ SB9600 message contains bits that indicate what the subsequent baud rate of SBEP messages will be. The host must know ahead of time what baud rates are supported by the target, and use one of these. In the preferred embodiment, once in SBEP mode, the baud rate will stay the same for that session of SBEP and cannot be changed. Other embodiments may include op codes for changing the baud rate while still in the SBEP mode.

In the bootstrap mode, baud rate selection will be done differently. There will be a header in the host file that contains the bootstrap code indicating what baud rate is to be used for SBEP during bootstrap mode. The host will be responsible for looking at the information in this file in order to set it's baud rate.

Figure 17:
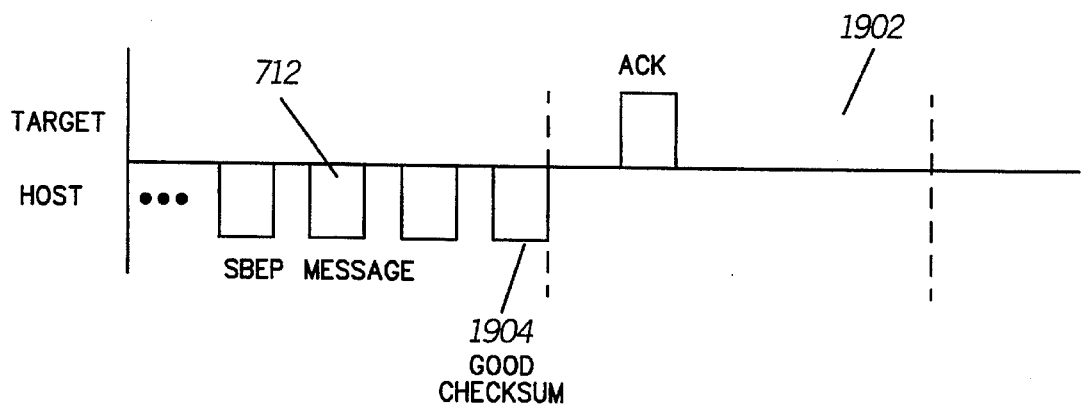
FIG. 17 shows the acknowledgment timing in accordance with the present invention.

Referring to FIG. 17, the ACK message is shown to be a one byte message that is used exclusively to tell the host that the message was received with a correct checksum 1904 by the target. When the host receives an ACK, it must not retry. The ACK must be sent within 10 SCI byte times after a correct message is received by the target. The ACK window 1902 defines this time limit. Failure to send the ACK within this period of time will indicate to the host that the target is not receiving, allowing the host to retry.

Figure 18:
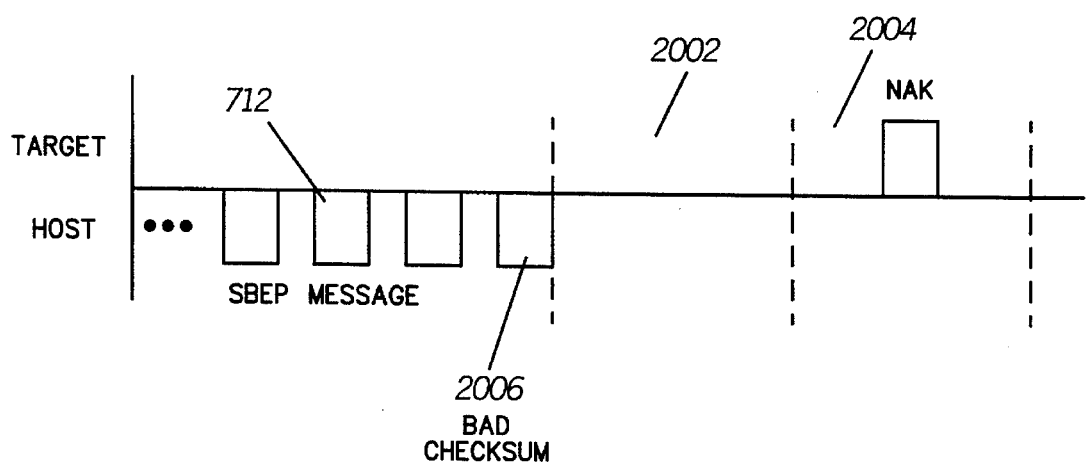
FIG. 18 shows a negative acknowledgment timing in accordance with the present invention.

Referring to FIG. 18, the NAK timing diagram is shown. The NAK message is used to tell the host that the previous message was received incorrectly by the target. An incorrectly received message could be caused by an incorrect checksum 2006, too few bytes in the message or too many bytes in the message. The NAK cannot be returned immediately to the host. The target must wait for the bus to be idle for 5 SCI bytes times before sending a NAK, as indicated by 2002. The NAK must be sent within 5 SCI bytes times after the bus has been idle for 5 SCI byte times, as indicated by 2004.

Figure 19:
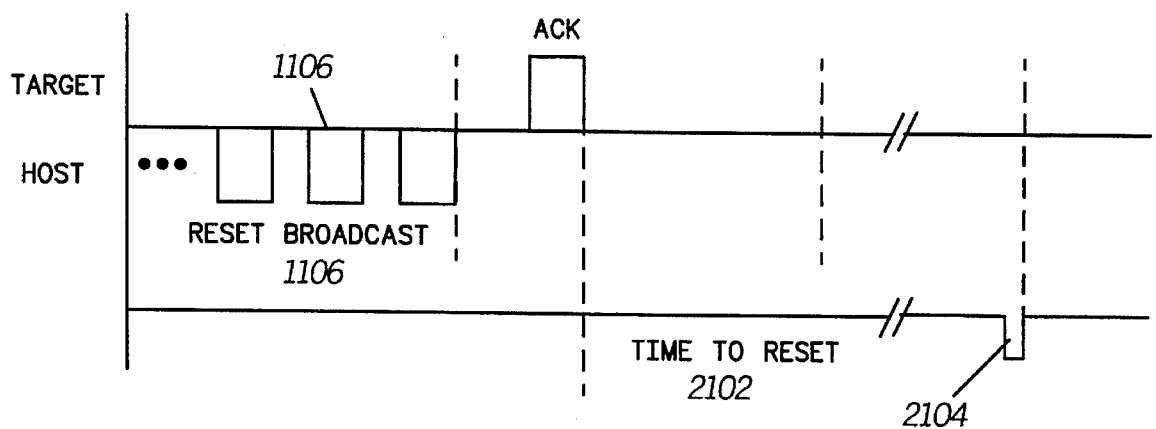
FIG. 19 shows reset broadcast timing in accordance with the present invention.

Referring to FIG. 19, a Reset-Broadcast Timing diagram in accordance with the present invention is shown. The RESET-BROADCAST message 1106 is used to tell the target to reset itself (2104). The target should go through a hardware reset as the result of this message. One way for the target processor to reset itself is to stop refreshing the COP timer. This message is used to enter bootstrap mode, or to exit SBEP. The target should come out of reset within 100 ms of sending the ACK back to the host. In order for the host to inform other nodes on the bus that the target will be resetting, the target must wait at least 30 ms before resetting. This time window is indicated by 2102.

In the preferred embodiment, the SBEP protocol can handle a number of requests. Some of these requests include: READ-DATA-REQ, CHECKSUM-REQ, STATUS-REQ, ERASE-FLASH-REQ, WRITE-DATA-REQ, and CONFIGURATION-REQ. Following is a brief description of each of these request messages.

The READ-DATA-REQ message is used to request the target to send up a block of data from a particular address. This address is contained in the address bytes of the message. The count of bytes that must be returned is contained in the BYTE-CNT (byte count). The BYTE-CNT is the actual number of data bytes that must be returned where $00 means zero bytes to be returned, and $FF 255 bytes. The message contains the data that was requested by the READ-DATA-REQ message. The READ-DATA-REPLY message is an implied READY-REPLY.

The CHECKSUM-REQ message instructs the target to perform a checksum operation starting at the address contained in the message address bytes for the count of bytes contained in the count bytes. There are two count bytes that specify how many bytes must be summed. The sum is defined as a straight sum starting at the address specified and discarding any bits that overflow the 16 bits allowed for the result. This message will be used at the conclusion of a Flash or EEPROM programming session to ensure that the part has all locations programmed correctly. The result is returned in the CHECKSUM-REPLY message. This message is returned to the host by the target with the checksum it obtained from the address specified in CHECKSUM-REQ. The checksum is contained in two bytes. The method for computing the checksum is described in the CHECKSUM-REQ message description.

The CONFIGURATION-REQ message is used to query the target for the size of its internal buffers during SBEP. The value returned by this op code is via the CONFIGURATION-REPLY message. The host must issue this message if it does not know what the largest message size the target can accept. The CONFIGURATION-REPLY message contains three additional bytes. The first two bytes of the additional bytes contain a count representing the largest message size that the target can accept.

The STATUS-REQ message is used to query the status of the target. In response the target sends a STATUS-REPLY message which contains an address field in order to indicate to the host what address is being accessed during a write or erase process. The status is not used at this time and will be defined on a per-radio basis as required.

The ERASE-FLASH-REQ message can only be used when the target is in bootstrap mode and contains a FLASH EEPROM. The target must erase its flash memory part upon receiving this message. If this message is issued to the target when it is not in bootstrap mode, the target should send the UNSUPPORTED-OP CODE REPLY and ignore the message.

Upon conclusion of the erase procedure, which may take several seconds, the target must return a 'GOOD WRITE REPLY'. This is the indication to the host that it may proceed. If the target could not erase the Flash entirely, a 'BAD-WRITE-REPLY' must be returned with the address where the erase algorithm failed.

Targets with flash memory devices that require the entire part to be programmed to zero before erasure must be given this message prior to the ERASE-FLASH-REQ message. It is optional, however, if the part is already known to be erased, such as when the part is known to be blank. Upon conclusion of the zeroing procedure, which may take several seconds, the target must return a 'GOOD WRITE REPLY'. The address contained in the GOOD-WRITE-REPLY is not important. This is the indication to the host that it may proceed. If the target could not zero the Flash entirely, a 'BAD-WRITE-REPLY' must be returned with the address where the programming to zero failed.

Figure 20:
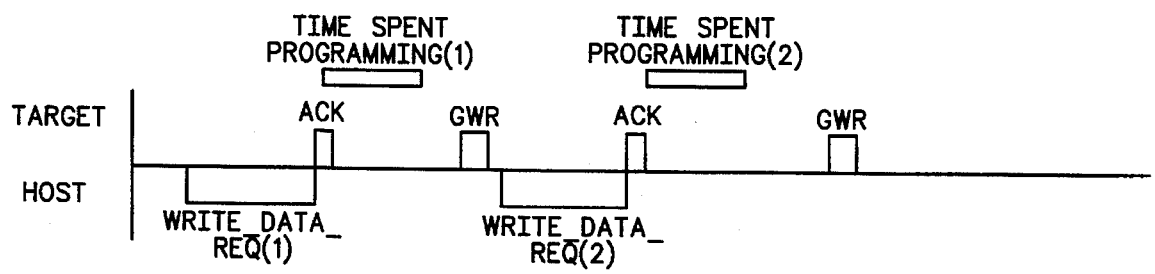
FIGS. 20, 21, and 22 show a first memory programming bus transaction with good write replies in accordance with the present invention.
Figure 21:
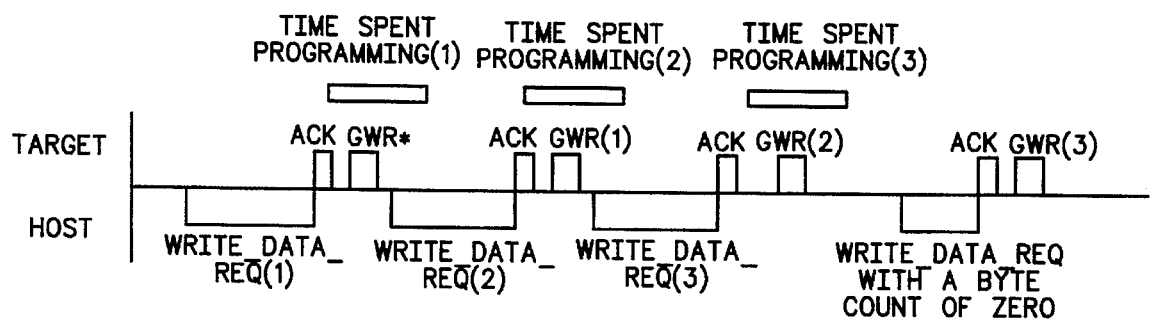
Figure 22:
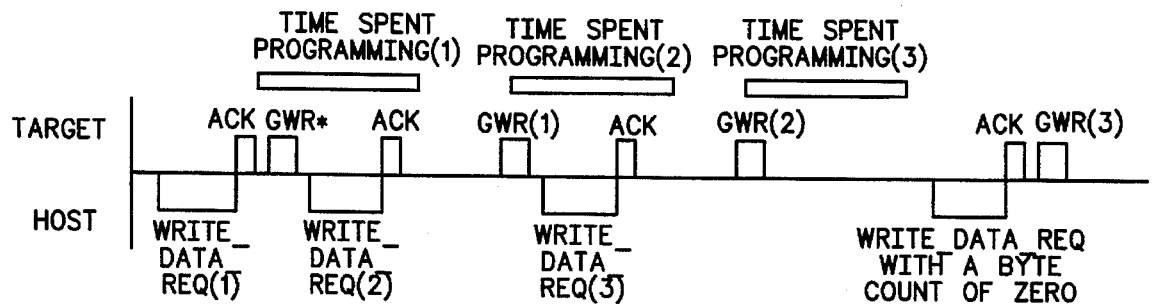

The WRITE-DATA-REQ is used to cause the target to write to one of its memory devices. This could be RAM, EEPROM (internal or external) or FLASH EEPROM. Two types of WRITE-DATA-REQ bus transactions are available in the preferred embodiment, single and double buffered target. FIGS. 20, 21, and 22 show timing diagrams for these transactions. These are memory programming bus transactions with good write replies.

In order to achieve the maximum possible throughput to the target while writing data, the SBEP protocol is designed to allow the target to implement double buffering. That is, the target can be capable of accepting a message over the serial bus while it is programming the last message to the memory device. For double buffering, the target must set aside two RAM buffers, one out of which to program the device, and another to accept a new message simultaneously.

The host does not care if the target is implementing double buffering or not. However, the host must always keep track of which WRITE-DATA-REQ messages got a GOOD-WRITE-REPLY (GWR) or a BAD-WRITE-REPLY (BWR). It is the responsibility of the host to retry those messages that did not result in a GWR.

Since the SBEP protocol requires that each message from the host receive a reply of some sort before it can send another message, the target will be allowed to send back a (GWR) with an address of all $FF, indicating to the host to send another message, but not giving any information as to whether or not the first message was actually programmed correctly to the device. The host must recognize at this point that the target is performing a double buffered implementation, and proceed to send another message. Once the target finishes programming the first message, it will be prepared to give a GWR or BWR to the host for the previous message, not the one just received. Effectively, the address contained in the replies will always be that of the penultimate message received. The host must be flexible enough to recognize that the address contained in the reply is not necessarily the address of the last message sent. After the last WRITE-DATA-REQ is sent to the target, there will be one more GWR or BWR queued up in the target. The host must issue one more WRITE-DATA-REQ with a count of zero bytes, triggering the target to send out the last good or bad write reply.

When the target sends out a WRITE-DATA-REQ message, no other message other than a WRITE-DATA-REQ message is allowed until a time out is satisfied. That is, the host may not send a WRITE-DATA-REQ followed by a READ-DATA-REQ unless the time-out for the write message expired. This rule, in conjunction with the rule about not sending a GWR or BWR unless followed by an ACK will prevent collisions between a GWR or BWR message and a retry of a WRITE-DATA-REQ when the target NAKs.

The time-out for the WRITE-DATA-REQ message is 20 ms for each byte of data to be programmed plus an additional 50 ms of safety time. That is, if a WRITE-DATA-REQ message has 10 data bytes in it, the host may not initiate another message other than a WRITE-DATA-REQ within 250 ms of the last ACK it received for a WRITE-DATA-REQ message.

Referring to FIG. 20 note that in single buffer target each GWR corresponds to the last WRITE-DATA-REQ Referring to FIG. 21 note that the second WRITE-DATA-REQ is accepted while the target is programming the first message, increasing throughput. This is possible because the host saw the 'dummy' GWR tagged with an asterisk. The baud rate or the programming time, whichever is slower, is the limiting factor in programming a device in the target.

In the preferred embodiment, a number of replies are supported in response to the requests mentioned above. Some of these replies include: GWR, BWR, UNSUPPORTED-0P CODE-REPLY, CONFIGURATION-REPLY, CHECKSUM-REPLY, READ-DATA-REPLY, AND STATUS-REPLY.

The GWR serves to tell the host that a WRITE-DATA-REQ message was successfully programmed into the designated memory device. A GWR message can only follow an ACK. That is, if the last message from the host was NAKed, then the target must wait before sending the GWR until the host is successful in reaching the target, i.e. a WRITE-DATA-REQ message is ACKed. The GWR contains the address which was contained in the WRITE-DATA-REQ message whose data was written correctly to memory. It is sent in response to a WRITE-DATA-REQ, but as noted in the discussion in WRITE-DATA-REQ, the address may not be that of the last WRITE-DATA-REQ message. A GOOD-WRITE-MESSAGE with an address field of all $FF serves to tell the host to send another message. Whenever the host receives a GWR, it may send another message immediately.

The BWR message serves to tell the host that the target was unsuccessful in programming the data contained in the WRITE-DATA-REQ message to the designated memory device. A BWR message can only follow an ACK. That is, if the last message from the host was NAKed, then the target must wait before sending the BWR until the host is successful in reaching the target, i.e. a WRITE-DATA-REQ message is ACKed.

The BWR contains the address which was contained in the WRITE-DATA-REQ message whose data was not written to memory. It is sent in response to a WRITE-DATA-REQ, but as noted in the discussion in WRITE-DATA-REQ, the address may not be that of the last WRITE-DATA-REQ message.

Figure 23:
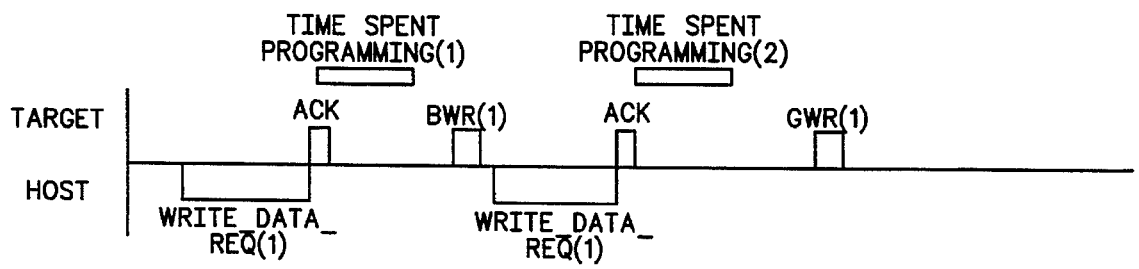
FIGS. 23, 24, and 25 show a second memory programming bus transaction with good and bad write replies in accordance with the present invention.
Figure 24:
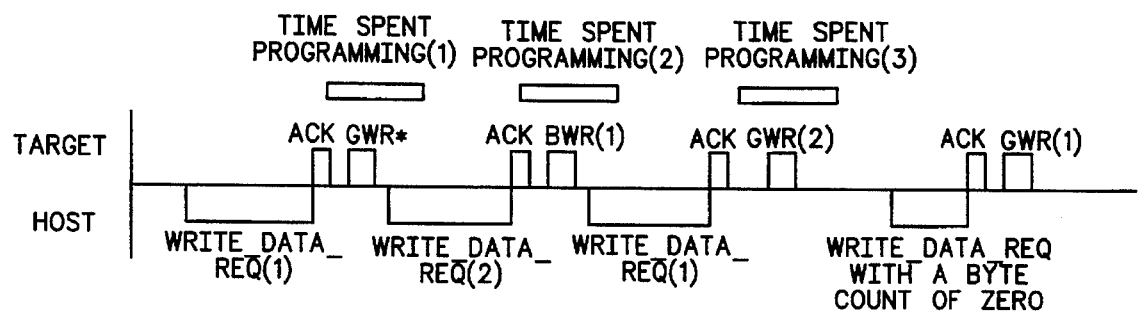
Figure 25:
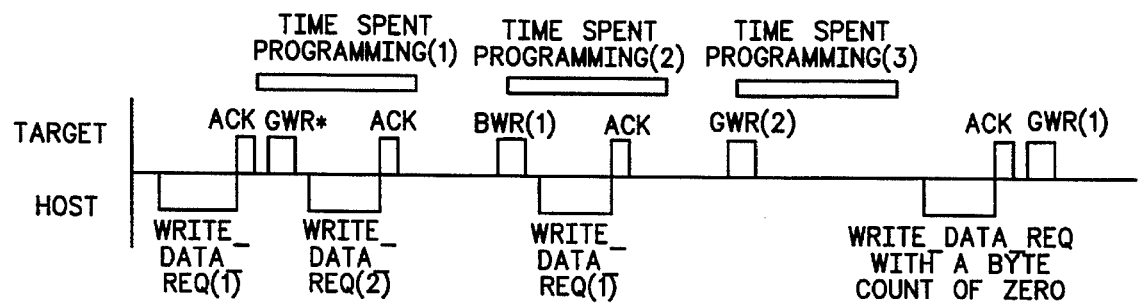

Whenever the host receives a BWR, it may send another message immediately. FIGS. 23, 24, and 25 illustrate the bus transactions when there are bad writes. These figures show a memory programming bus transaction with good and bad replies in accordance with the present invention.

As has been demonstrated, the SBEP protocol is relatively simple to implement since the code required to perform the protocol is small enough to load into a microprocessors boot strap RAM. By being able to communicate with a radio in the bootstrap mode, combined with the FLASH EEPROM devices, we are now able to change a customer's radio software without even opening the radio. In other words, using available bootstrap technology, a radio can be started using bootstrap mode of an internal microprocessor, and then programmed with a desired program using the highly efficient protocol.

In summary it has been disclosed that a significant aspect of the present invention is the capability to switch from one protocol to another along with baud rate change requests. This is accomplished by sending a message in the first protocol to select which options should switch and to tell all other options to suspend bus operations. A busy line is used and is held in the active state for the duration of all activities taking place on the second protocol to inform all subsections to stay away from the bus. Once SBEP messaging is complete, the busy line is released and all options revert to SB9600. The ability of the SBEP protocol to operate on a bi-directional serial data bus reduces the number of connections required. This is highly desired in applications where equipment are not in dose vicinity of each other and require long cables.

A benefit of the SBEP protocol is its ability to adapt itself so that either the baud rate or the programming time become the limiting factor in the communication speed. This is very valuable because this protocol can remain the same as baud rates increase and programming times decrease. Yet another benefit of the present invention is its capability to handle variable length messages in one structured format.

Although the description of the preferred embodiment has concentrated on two particular protocols SP9600 and SBEP it should be well understood that the principles of the present invention can be well enjoyed by other protocols. The presentation of specific embodiments is directed to providing an understanding of the present invention and shall not be construed as a limitation thereof.

What we claim is:

1. A radio system, comprising:

a communication device having at least one addressable processor means;

at least one additional addressable processor means;

a communication means, comprising a serial communication link, for interconnecting the at least one and the at least one additional addressable processor means, the communication means includes a signal line and a busy line;

a first communication protocol including a plurality of information packets for passing parametric data between the at least one and the at least one additional addressable processor means, the first communication protocol further including a first information packet for changing the communication protocol and changing the baud rate to a baud rate chosen from among a plurality of baud rates; and a second communication protocol including a second plurality of information packets for passing parametric data to or from the addressable processor means at selectable speeds, the second plurality of information packets include information on the length of a second information packet that will immediately follow the first information packet, the second communication protocol further including the second information packet which has an uninterrupted variable length;

whereby the operating state of the addressable processor means is determined or altered by, respectively, communicating parametric data between the at least one and the at least one additional addressable processor means.

2. The radio system of claim 1, wherein the first and second information packets include:

a variable length operation code;

a variable length message size packet optional data; and optional error detection data.

3. The radio system of claim 2, wherein the first and second information packets further comprise an address.

4. The radio system of claim 1, wherein the second communication protocol includes at least one of the information packets of the first communication protocol.

5. The radio system of claim 1, wherein the variable operation code includes one or more codes selected from the group of codes consisting of reset operation code, read operation code, write operation code, bit set operation code, bit clear operation code, acknowledge operation code, and negative acknowledge operation code.

6. The radio system of claim 4 wherein the optional error detection includes a cyclic redundancy check packet.

7. The radio system of claim 4 wherein the optional error detection data includes a check sum packet.

8. A register-modeled radio device, comprising:

a communication device having at least one register-modeled processor means;

at least one additional register-modeled processor means;

a serial communication link including a signal line and a busy line for coupling and providing communication between the at least one register-modeled processor means and the at least one additional register-modeled processor means;

a fixed baud rate communication protocol for passing parametric data between the at least one and the at least one additional register-modeled processor means, the communication protocol comprising an information packet for establishing communication between at least one and the at least one additional register-modeled processor means at a selectable baud rate, the information packet further comprising:

information for changing the communication protocol between the at least one and the at least one additional register-modeled processor means;

optional information for preventing other register-modeled processor means from interfering with the communication between the at least one and the at least one additional register-modeled processor means;

a selectable baud rate communication protocol for communicating information to or from the at least one and the at least one additional register-modeled processor means using the serial communication link, the selectable baud rate communication protocol comprising:

an uninterrupted variable length operational code selected from the group of codes consisting of reset operation code, read operation code, write operation code, bit set operation code, bit clear operation code, acknowledge operation code, negative acknowledge operation code; and a variable length size identifier code;

whereby the virtual state of the at least one and the at least one additional register-modeled processor means is determined or altered, respectively, by communicating information between at least one and the at least one additional the register-modeled processor means.

9. The register-modeled radio communication device of claim 8, wherein the selectable baud rate communication protocol further comprises at least one data packet.

10. The register-modeled radio communication device of claim 8, wherein the selectable baud rate communication protocol further comprises at least one error detection packet.

11. In a radio communication system having a plurality of addressable register means, a method of communicating between the plurality of addressable register means comprising the steps of:

generating, in a first addressable register means of a communication device, a fixed length information packet having at least a protocol switch operation code, an address, and an error detection code;

activating, in the first addressable register means, a hardware busy line to prevent other addressable components from interfering in the communication between the first and a second addressable register means;

transmitting, the fixed length information packet to the second addressable register means using a fixed baud rate communication protocol over a serial communication link;

receiving, at the second addressable register means, the fixed length information packet from the serial communication link;

switching the communication protocol at the first and the second addressable register means to a selectable baud rate communication protocol in response to the contents of the protocol switch operation code;

communicating uninterrupted variable length information packets between the first and the second addressable register means using the selectable baud rate communication protocol; and releasing, in the first addressable register means, the hardware busy line to force the first and the second register means to revert back to the first communication protocol and to allow the plurality of addressable register means to communicate to each other.

12. In a radio communication system having a plurality of addressable register means, a method of communicating between the plurality of addressable register means comprising the steps of:

generating, in a first register means, an information packet having baud rate change information and an error detection code;

activating, in the first addressable register means, a hardware busy line to prevent other addressable components from interfering in the communication between the first and a second addressable register means;

transmitting, the information packet to a communication device having a second register means using a first baud rate communication protocol over a serial communication link;

receiving, at the second register means, the information packet from the serial communication link;

switching the baud rate at the first and the second register means to a second baud rate in response to the baud rate change information which is contained in the information packet;

communicating uninterrupted variable length information packets between the first and the second addressable register means using the second baud rate; and releasing, in the first addressable register means, the hardware busy line to force the first and the second addressable register means to revert back to the first communication protocol and to allow the plurality of addressable register means to communicate to each other.

13. The method of claim 12, further including the step of performing the operation designated by the variable length information packet.

14. In a radio communication system having a plurality of addressable components, a method of communicating between the plurality of addressable devices using a plurality of modes comprising the steps of:

generating, in a first addressable component, a first information packet using a first mode having at least a first operation code, an address, and a fixed length argument;

activating, in the first addressable component, a hardware busy line to prevent other addressable components from interfering in the communication between the first and the second addressable components;

transmitting, serially, the first information packet to a communication device having a second addressable component over a serial communication link;

receiving, serially at the second addressable component, the first information packet from the serial communication link;

switching at the first and the second addressable components to a second mode based on the contents of the first information packet;

generating, in the first addressable component, a second information packet using the second mode having at least a second operation code, and an uninterrupted variable length argument;

transmitting, serially, the second information packet to the second addressable component over a serial communication link;

receiving, serially at the second addressable component, the second information packet from the serial communication link; and performing at the second addressable component the operation designated by the second operation code;

releasing, in the first addressable component, the hardware busy line to force the first and the second addressable components to revert back to the first mode and to allow the plurality of addressable components to communicate to each other.

15. The method of claim 14, further including the step of communicating additional packets between the first and the second addressable components using the second mode.

16. The method of claim 15, wherein the step of generating the second information packet includes generating an information packet having a plurality of sub-packets having at least one checksum sub-packet.

17. The method of claim 16, wherein the step of generating the second information packet includes the step of ensuring that the time between the transmission of the sub-packets does not exceed a pre-determined time interval.

18. The method of claim 17, further including the step of sending, from the second addressable component, a negative acknowledge when the time between the transmission of the sub-packets exceeds the pre-determined time interval.

19. The method of claim 18, further including the step of sending, from the second addressable component, a negative acknowledge when an error was detected based on the checksum sub-packet.

20. The method of claim 19, further including the step of retransmitting, in the first addressable component, the additional information packets.

21. A method of programming a radio communication device using a programming device, comprising the steps of:

generating, in the programming device, a fixed length information packet having at least a protocol switch operation code and an error detection code;

activating, in the programming device, a hardware busy line to prevent other addressable components from interfering in the communication between the programming device and the radio communication device;

transmitting, the fixed length information packet to the radio communication device using a fixed baud rate communication protocol over a serial communication link;

receiving, at the radio communication device, the fixed length information packet from the serial communication link;

switching at the programming device and the radio communication device to an uninterrupted variable length and selectable baud rate communication protocol in response to the information contained in the fixed length information packet;

transmitting programming information from the programming device to the radio communication device using the second communication protocol; and programming the radio communication device using variable length information packets transmitted by the programming device; and releasing, in the programming device, the hardware busy line to force the programming device and the radio communication device to revert back to the first communication protocol and to allow the programming device and the radio communication device to communicate to each other.

22. A method of programming a radio communication device using a programming device, comprising the steps of:

generating, in the programming device, a first information packet having at least a protocol switch operation code and an error detection code;

activating, in the programming device, a hardware busy line to prevent other addressable components from interfering in the communication between the programming device and the radio communication device;

transmitting, the first information packet to the radio communication device using a first communication protocol having a first baud rate over a serial communication link;

receiving, at the radio communication device, the first information packet from the serial communication link;

switching at the programming device and the radio communication device to a second communication protocol in response to the information conveyed by the first information packet, the second communication protocol using an uninterrupted variable length message block; and transmitting programming information from the programming device to the radio communication device using the second communication protocol; and programming the radio communication device; and releasing, in the programming device, the hardware busy line to force the first and the radio communication device to revert back to the first communication protocol and to allow the programming device and the radio communication device to communicate to each other.

\* \* \* \* \*